(12) United States Patent
Spelleken

(10) Patent No.: US 6,332,765 B1
(45) Date of Patent: Dec. 25, 2001

(54) CUTTER HUB HOLDER

(75) Inventor: Juergen Spelleken, Dinslaken (DE)

(73) Assignee: Gala Industries, Inc., Eagle Rock, VA (US)

( * ) Notice: Subject to any disclaimer, the term of this patent is extended or adjusted under 35 U.S.C. 154(b) by 0 days.

(21) Appl. No.: 09/562,021

(22) Filed: May 1, 2000

Related U.S. Application Data

(63) Continuation-in-part of application No. 08/966,524, filed on Nov. 10, 1997, now abandoned.

(30) Foreign Application Priority Data

Nov. 15, 1996 (DE) ................................................ 196 47 396

(51) Int. Cl.$^7$ .................................................... B29B 9/06
(52) U.S. Cl. ............................ 425/67; 264/142; 425/168; 425/196; 425/313
(58) Field of Search ............................... 264/142; 425/67, 425/196, 311, 313, 168

(56) References Cited

U.S. PATENT DOCUMENTS

| 2,432,734 | 12/1947 | Doesken . |
| 3,196,487 | 7/1965 | Snelling . |
| 3,317,957 | 5/1967 | Heston et al. . |
| 3,353,213 | 11/1967 | Niemeyer ............................... 425/313 |
| 3,832,114 | 8/1974 | Yoshida ................................. 425/313 |
| 3,912,434 | 10/1975 | Nagahara et al. ..................... 425/142 |
| 4,123,207 | 10/1978 | Dudley .................................... 425/67 |
| 4,179,255 | 12/1979 | Hale ........................................ 425/67 |
| 4,500,271 | 2/1985 | Smith ..................................... 425/67 |
| 4,529,370 | 7/1985 | Holmes et al. ........................ 425/142 |
| 4,614,307 | 9/1986 | Lauser ................................. 241/101.4 |
| 4,728,276 | 3/1988 | Pauley et al. ........................... 425/67 |
| 4,813,829 | 3/1989 | Koppelmann ........................ 409/136 |
| 5,059,103 | 10/1991 | Bruckmann et al. ................... 425/67 |
| 5,110,523 | 5/1992 | Guggiari ............................... 264/40.5 |
| 5,146,831 | 9/1992 | Fetter, Jr. et al. ....................... 83/698 |
| 5,190,768 | 3/1993 | Ishida et al. ............................. 425/67 |
| 5,435,713 | 7/1995 | Yamasaki et al. ..................... 425/311 |
| 5,527,176 | 6/1996 | Ishida ................................... 425/142 |

FOREIGN PATENT DOCUMENTS

| 26 38 126 | 3/1978 | (DE) . |
| 44 08 235 | 2/1995 | (DE) . |
| 0 418 941 | 3/1991 | (EP) . |
| 1 388 297 | 3/1975 | (GB) . |
| 2 154 501 | 9/1985 | (GB) . |
| 2 319 206 | 5/1998 | (GB) . |

OTHER PUBLICATIONS

Abstract of DE 3721235, Mannesmann, Which is Dated Feb. 18, 1988.
WPI Abstract Accession No. 94–290387[36] JP 06218727 A (Kobe Steel) Aug. 9, 1994, Abstract.
Gala brochure, Pneumatically Adjustable Cutter (No Date).
Gala brochure, Underwater Pelletizing Systems (No Date).
Gala brochure, Quality (No Date).

*Primary Examiner*—Robert Davis
(74) *Attorney, Agent, or Firm*—Jacobson Holman, PLLC

(57) ABSTRACT

A cutter hub holder for blades acting against a die plate of an underwater pelletizer including a resilient axially biased blade holder that is drivingly connected with a driven shaft and biased axially toward the die plate by a piston and piston rod engaging a resilient device by a variably controlled pressure. The motor shaft has a through bore to introduce the variably controlled pressure to vary the resilient axial bias exerted on the cutter hub holder. In one embodiment, the driving connection between the shaft and cutter hub holder includes a quick connect and disconnect drive coupling to enable the blade holder to be quickly replaced. In another embodiment, the driving connection between the shaft and cutter hub holder includes an axially movable keyed connection and the piston rod includes two axially spaced pistons to increase the axial force exerted on the cutter hub holder through a resilient device.

29 Claims, 4 Drawing Sheets

CUTTER HUB HOLDER

CROSS REFERENCE TO RELATED APPLICATION

This application is a continuation-in-part of copending application, U.S. Ser. No. 08/966,524 filed Nov. 10, 1997, entitled Cutter Hub Holder and now abandoned.

BACKGROUND OF THE INVENTION

1. Field of the Invention

The invention relates to a cutter hub holder for blades acting against a die plate of an underwater pelletizer including a resiliently biased blade holder that is drivingly connected with a driven shaft and biased axially toward the die plate at a variable controlled pressure. In one embodiment of the invention, the driving connection between the shaft and blade holder includes a bayonet quick connect and disconnect drive coupling including an axially movable key and groove drive connection. In another embodiment of the invention, the driving connection between the shaft and blade holder includes an axially movable key drive connection.

2. Description of the Prior Art

The following U.S. patents and German document relate to developments in underwater pelletizers.

| | | |
|---|---|---|
| 2,432,734 | 4,123,207 | 5,059,103 |
| 3,196,487 | 4,179,255 | 5,110,523 |
| 3,317,957 | 4,500,271 | 5,148,831 |
| 3,353,213 | 4,529,370 | 5,190,768 |
| 3,832,114 | 4,614,307 | 5,435,713 |
| 3,912,434 | 4,728,276 | 5,527,176 |
| German Document 2,638,126 | | |

The above patents disclose (a) an arrangement that manually controls displacement of the cutter assembly to compensate for blade wear and maintain the proper blade-to-die pressure, (b) an arrangement that automatically advances the blade by a stepping motor activated by a sensor that detects blade wear by sensing the relative distance between the cutter assembly and the die, (c) a spring that exerts pressure against the knife holder assembly, (d) electronic circuits for controlling hydraulic pressure to automatically displace the drive shaft and thereby control blade-to-die pressure, and (e) an arrangement that includes a pressure chamber receiving fluid pressure through a bore in a drive shaft to bias the cutter blades toward the die plate. However, the above patents do not disclose a structure which delivers variable pneumatic or hydraulic pressure to a piston and cylinder incorporated into the drive shaft to an intermediary member which, in turn, exerts a force against a spring or other resilient member or material that axially displaces the cutter assembly or cutter hub to maintain optimum pressure on the cutter blades toward the die face. Also, the above patents do not disclose a bayonet coupling cutter hub attachment to the drive shaft of an underwater pelletizer which permits relative axial movement therebetween.

In a cutter hub holder of this type, such as generally disclosed in U.S. Pat. No. 5,059,103 issued Oct. 22, 1991, the cutter hub is pressed against the die plate by a spring, in order to compensate for wear of the cutting blades and to ensure a permanent contact of the cutting blades with the die plate. In the known cutter hub holder, the spring pressure is selected to satisfy the needs during pelletizing. This pressure force is thus always set to the highest pressure required during operation, while there are phases in operation, during which a lower spring force would be sufficient. Yet, the higher the spring pressure acting on the blade holder, the greater the wear of the blades and of the die plate.

Any equipment utilizing manual adjustment methods for the cutter holder and blades requires considerably more operator attention while the equipment is running. As the blades wear, the pellet quality decreases causing the operator to constantly monitor the process and adjust the blades. The amount of adjustment that is made will vary from one operator to the next. Often the tendency is to over adjust, causing premature blade and die wear. The present invention uses constant, controllable fluid pressure, pneumatic or hydraulic, to continually adjust the cutter blades. The pressure can be set as light or as heavy as required allowing the operator to make one setting with no further adjustment required. A compression spring or other resilient member or material is used in the cutter head to assure constant contact between the die and cutter.

Cutter hub holders utilizing a compression spring alone to adjust the blades offers no flexibility for varying the pressure of the cutter blades against the die face. A spring of the desired tension must be installed in the cutter head during setup. Once the machine is running, the spring tension cannot be varied, even though a heavier or lighter spring may be required. The entire cutting process must be stopped, if the spring is to be changed. With a controllable fluid pressure, as proposed by the instant invention, the blade to die pressure can be adjusted as light or as heavy as required with a simple fluid pressure regulator.

Pneumatic or hydraulic pressure can be used to vary the force exerted on the spring or other elastic member or material to maintain optimum pressure on the cutter blades toward the die plate. When hydraulic pressure is used, a dedicated hydraulic power unit for controlling the blade to die pressure is required and provisions must be made on or around the equipment to house a hydraulic power unit. Also, a designated control circuit is required for the drive motor on the hydraulic power unit and special care must be taken to prevent hydraulic oil from leaking into the process water, even in the event of a seal failure. When pneumatic pressure is used, installation of an air line is all that is required. In environments where equipment of this nature is installed, compressed air lines are commonly available. Therefore, pneumatic pressure is more simply applied for the present invention, but hydraulic pressure can also be used if desired.

SUMMARY OF THE INVENTION

As used herein, the cutter hub holder of the present invention includes the components which interconnect the blade holder or cutter hub on which the cutter blades are mounted and the drive shaft of the electric, pneumatic or hydraulic drive motor which rotates the cutter hub with the cutter blades mounted thereon.

According to the present invention the cutter hub carrying the blades is pressed against the die plate at variable pressure by the cutter hub holder so that the optimum pressure for the current operational state is always used. This means that during normal operation, pelletizing can be made at a lower pressure while it is possible to respond with a short-term higher blade pressure in response to changes occurring during operation.

Such higher pressure of the cutter hub against the die plate during operation may, for example, be required if a polymer layer forms on the cutting surface of the blades or die plate as a result of smearing. Such a layer will reduce the cutting performance and the quality of the cut pellets so that the plant must be shut down to remove the polymer layer which results in substantial disruptions and interruptions in operation. The cutter hub according to the present invention permits the removal of a polymer layer forming on the cutting surfaces by a short-term increase in the pressure of the blades against the die plate so that the cutting surfaces are cleaned. Subsequently, production can be continued at a gentle, lower blade pressure.

For another example, it is sometimes necessary to start pelletizing a material of very low viscosity at a high pressure of the blades against the die plate. After stabilization of the extrusion and pelletizing process, the pressure of the blades against the die plate may, however, be reduced and pelletizing can be made at a lower pressure which will minimize the wear of the blades and the die plate.

With the cutter hub holder according to the present invention, the pressure of the holder and thus the pressure of the blades against the die plate may be adapted to the current operational requirements, so that the wear of the blades and of the cutting surface and/or of the die plate can be limited to the inevitable amount.

Preferred embodiments of this invention provide that the holder can be pressurized pneumatically or hydraulically in the direction of the die plate. The pressure can be controlled in a simple way so that the control equipment permits a simple and fast adjustment of the pressure currently needed.

A further inventive development provides that the drive shaft, such as that of an electric or hydraulic motor, is provided with an axial bore, with the end of the bore pointing to the cutter hub holder being extended to a cylinder bore and with the other end being connected to a source of regulated compressed air or regulated pressurized hydraulic fluid by a rotary transmission leadthrough, and that the cylinder bore contains a piston, the piston rod of which acts indirectly on the holder through a compression spring or other resilient member or material.

In one embodiment of the present invention, the cutter hub holder is conveniently constructed as a tubular head piece connected with the shaft or with an intermediary connected with the shaft in such a way that it can be shifted axially but cannot be rotated, with the head piece having a through bore stepped with at least two annular shoulders or a pocket hole stepped with at least one annular shoulder and with a pressure spring or other resilient member or material being inserted between the outer annular shoulder of the through hole or the bottom of the pocket hole and the piston rod. The pressure exerted by this pressure spring or other resilient device may be varied by changing the position of the piston rod and may thus be adapted to the currently needed pressure of the blades against the die plate.

In order to permit a fast replacement of the blades and cutter hub without prolonged interruption of the operation, a further inventive development provides that the head piece of the cutter hub holder is drivingly and separably connected to the shaft or an intermediary connected with the shaft by a bayonet coupling. The bayonet coupling may conveniently be constructed in conjunction with the pressure spring or other resilient device so that the pressure spring or resilient device will keep the bayonet coupling in its locked position.

The bayonet coupling consists of two parallel grooves in the shaft, one of which is open at an end of the shaft. The other groove terminates inwardly of the end of the shaft and the grooves are connected with each other at their inner ends by a radial circumferential groove. The head piece includes a key protruding into its bore which engages and can be shifted in the grooves of the shaft. The head piece can be moved axially on the shaft until the key reaches the inner end of the open ended groove or grooves and then rotated so that the key or keys enter the other groove or grooves which serves to lock the head piece to the shaft but still permits axial movement of the head piece in relation to the shaft. Conveniently, the pressure of the spring or other resilient member or material is selected so that it roughly corresponds to or is even higher than the highest pressure of the blades against the die plate. In order to remove the head piece it is only necessary to press the same axially inwardly against the resilient device and to turn it against the direction of rotation of the drive so that the key or keys can be pulled out of the open ended groove or grooves of the bayonet coupling. The key and groove arrangement is preferably duplicated at diametrically opposite areas or in equal circumferentially spaced areas of the shaft and head piece. In the preferred form, there are two groove assemblies and two keys on diametrically opposites sides of the shaft and two keys extending into the bore of the head piece. Also, a multiple spline axially movable connection may be used between the head piece and the drive shaft on an intermediary. However, one key and groove assembly could be used, as well as more than two.

In another embodiment of the invention, the cutter hub holder includes a head piece connected with the drive motor shaft or an intermediary, by an axially movable keyed connection. The drive shaft of the motor includes a bore and a piston rod having two piston heads thereon to multiply the force applied to a pressure spring or other resilient member or material engaged with the head piece to exert pressure on the head piece from the piston rod through the pressure spring or other resilient device. The pressure exerted by the resilient device is varied by varying the pressure exerted by the piston rod thereby adapting the pressure of the blades against the die face to a currently needed pressure.

It is an object of the present invention to provide a cutter hub holder for an underwater pelletizer which permits reduction of wear of the blades and of the die plate while maintaining full control of all operational states by biasing the holder toward the die plate at a controlled variable pressure, preferably using a regulated pneumatic or hydraulic pressure.

Another object of the invention is to provide a cutter hub holder in which fluid pressure combined with a resilient device exert pressure on the cutter hub holder toward a die plate of an underwater pelletizer with the fluid pressure passing through a bore in a motor drive shaft which rotatably drives the cutter hub holder.

Another object of the invention is to provide a cutter hub holder in accordance with the preceding object in which the bore through the drive motor shaft is associated with a cylinder having a piston movable therein which includes a piston rod engaged with the resilient device.

A still further object of the invention is to provide a cutter hub holder in accordance with the preceding object in which the piston rod is connected to a pair of pistons movable in a cylindrical bore in the drive motor shaft to enable an increase in the total force exerted on the piston rod by utilizing a pair of pistons on the piston rod with the fluid pressure exerting pressure against both pistons.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
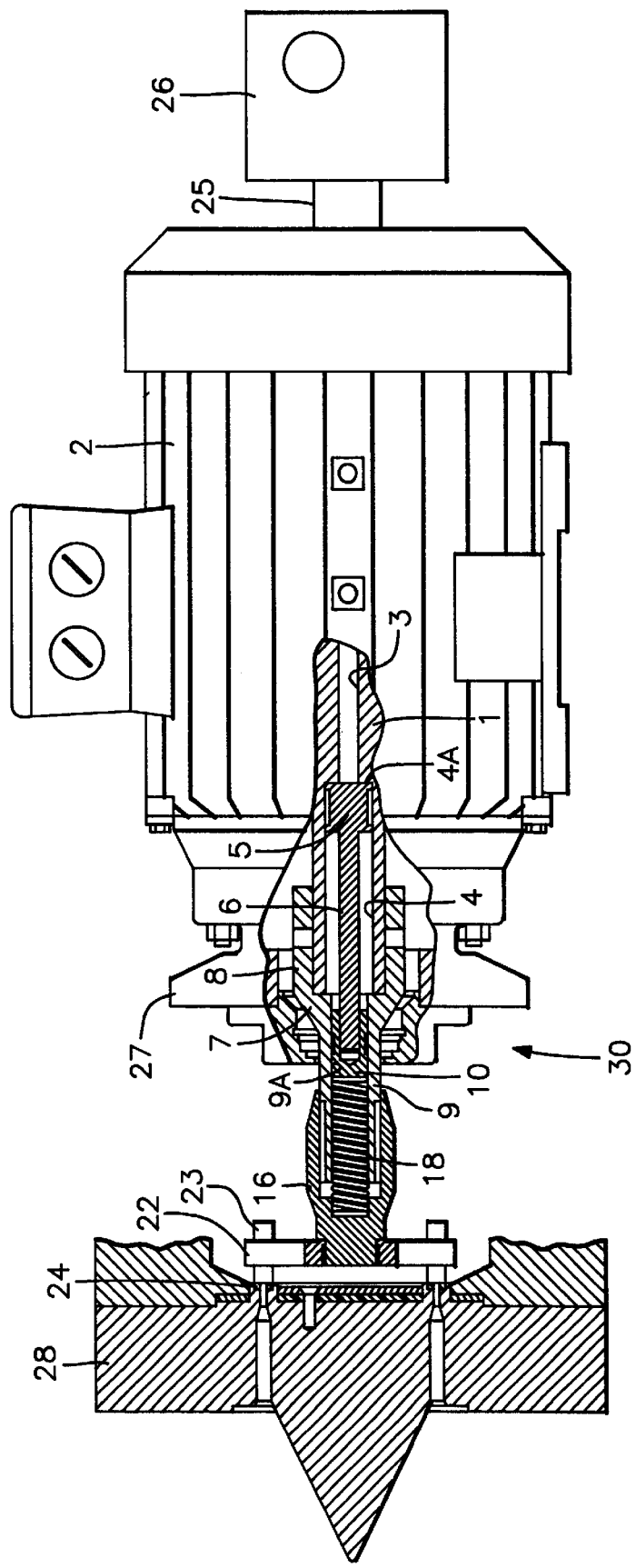
FIG. 1 is a longitudinal sectional view of one embodiment of the cutter hub holder and associated drive assembly in accordance with the present invention.

Although two preferred embodiments of the invention are explained in detail, it is to be understood that the invention is not limited in its application to the details of construction and the arrangement of components set forth in the following description or illustrated in the drawings. The invention is capable of other embodiments and of being practical or carried out in various ways. Also, in describing the preferred embodiments, specific terminology will be resorted to for the sake of clarity. It is to be understood that each specific term includes all technical equivalents which operate in a similar manner to accomplish a similar purpose.

The cutter hub holders according to the present invention are described with reference to the cutter hub holder of an underwater pelletizer generally constructed in the same way as disclosed in U.S. Pat. No. 5,059,103. The first embodiment of the cutter hub holder according to the present invention is shown in FIGS. 1–4 of the drawings and is generally designated by the reference numeral 30. It differs from the cutter hub holder disclosed in the aforesaid patent by the features which will be more fully described in the following.

The cutter hub holder 30 includes a motor shaft 1 of an electric, pneumatic or hydraulic drive motor 2 which is provided with a generally central bore 3. At its power take-off end, the central bore 3 is extended to a cylinder bore 4 via an annular shoulder 4A. This cylinder bore 4 contains a piston 5 which is connected with a piston rod 6 of a diameter less than piston 5.

The power take-off end of the shaft 1 carries a tubular intermediary 7, the rear end of which is extended to a sleeve 8 which laps over and is connected with the shaft 1. The intermediary 7 is provided with a front cylindrical part 9 which has a smaller diameter than the sleeve 8. This cylindrical part 9 is provided with a smaller diameter through bore 9A which is substantially aligned with bore 3 and the cylinder bore 4 and receives a slidable member 10 fixed to the piston rod 6.

Figure 4:
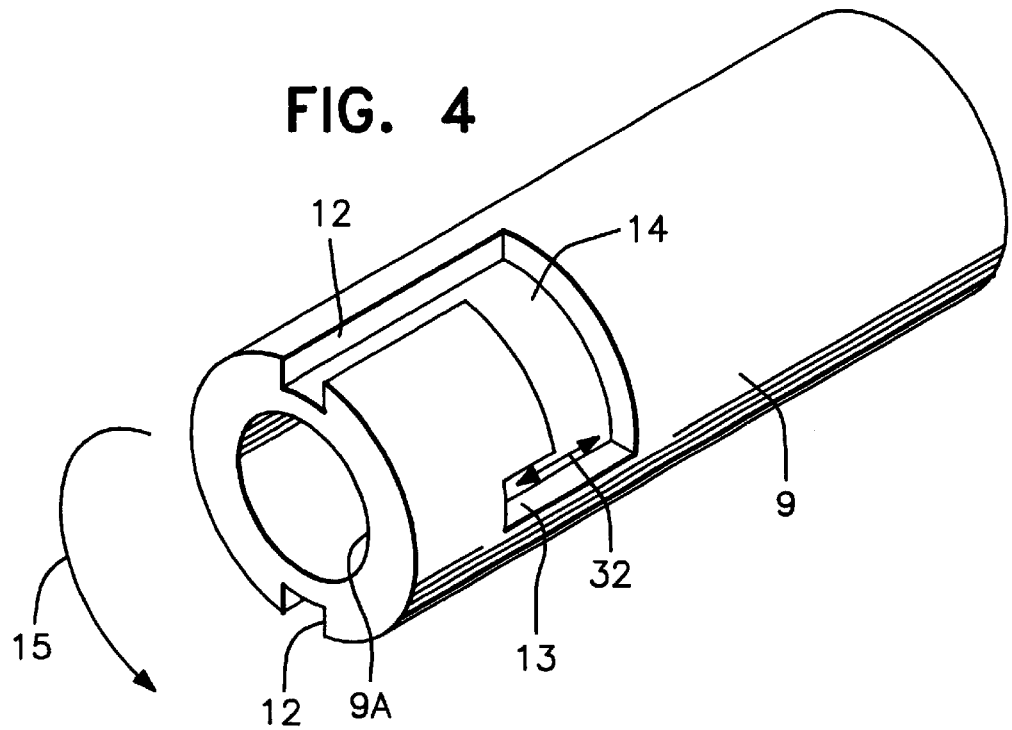
FIG. 4 is a perspective view of the intermediary portion of the shaft with the grooves forming a portion of the bayonet coupling.

As shown in FIG. 4, the cylindrical part 9 of the intermediary 7 is provided with diametrically opposed external groove assemblies forming part of a bayonet coupling. Each groove assembly includes an open end groove 12 and a groove 13 which is parallel to groove 12 and closed at its outer end. The inner end of the grooves 12 and 13 are connected with each other by a radial peripheral groove 14. Groove 12 is offset in relation to groove 13 against the direction of rotation of the shaft as indicated by the arrow 15 in FIG. 4. The grooves 12, 13 are machined into the surface of the cylindrical part 9 generally parallel to the axis of the part 9.

Figure 2:
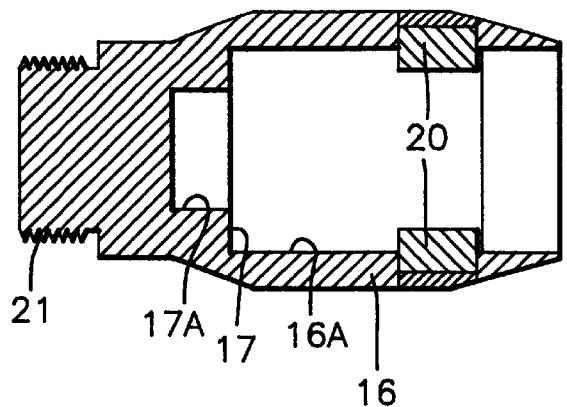
FIG. 2 is a longitudinal sectional view of the head piece.
Figure 3:
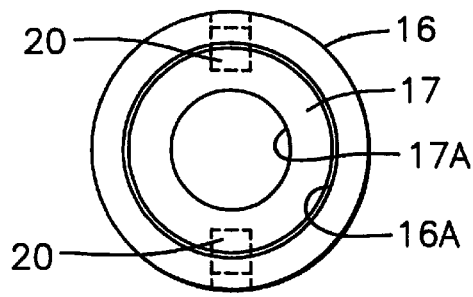
FIG. 3 is an end view of the head piece.

The cylindrical part 9 of the intermediary 7 holds a head piece 16. The head piece 16 consists of a rotationally symmetrical part with a blind bore 16A having an annular shoulder 17 at its inner end as shown in FIG. 2. The head piece 16 telescopically receives the cylindrical part 9. A pressure spring 18 or other resilient member or material, such as elastomeric material, is inserted in bore 16A between slidable member 10 and a generally central recess 17A which forms shoulder 17.

The bore 16A of the head piece 16 is provided with diametrically opposite keys 20 which protrude radially into the bore 16A and are held in place as by welding or the like. The front end of the head piece 16 is provided with an external thread 21 on which the cutter blade holder 22 is threaded as shown in FIG. 1.

To place the head piece 16 onto the cylindrical part 9, the keys 20 are inserted into the opposite bayonet grooves 12 and are pushed inwardly to the bottom of these grooves, thus compressing the pressure spring 18 or other resilient device so that the keys 20 can be locked in grooves 13 by arcuate shifting through the radial grooves 14. Further, the keys 20 are preferably shorter longitudinally than the grooves 13 which enables axial movement of the head piece 16, as shown by arrow 32 in FIG. 4. This axial movement of head piece 16 against the resistance of spring 18, or other resilient device, biases the cutter hub or blade holder 22 and cutter blades 23 toward die plate 24 through the spring 18 or other resiliently compressible member or material.

The other end 25 of the bore 3 in motor shaft 1 is provided with a stationary rotary transmission leadthrough 26 at which a compressed air line or a pressurized hydraulic fluid line is connected through a pressure regulating valve to sense and control the pneumatic or hydraulic pressure entering the bore 3 in motor shaft 1. The flange 27 fixed at the motor housing serves, as is basically known from U.S. Pat. No. 5,059,103, for connection with the water box with water flow and return lines and the die plate 28 across which the blades 23 of the cutter hub 22 wipe.

The quick connect and disconnect capability of the cutter hub 22, head piece 16 and intermediary 7 is provided by the bayonet grooves 12, 14 and 13 coacting with the keys 20. When the components are in an assembled relation, and it is desired to quickly disconnect the cutter hub 22 after the flange 27 has been separated from the water box and the motor housing and related structure have been moved away from the die face, it is only necessary to exert an axial force on the cutter hub 22 to compress the spring 18 or other resilient device sufficiently to align the keys 20 with the grooves 14 and rotate the cutter hub 22 in a counterclockwise direction as indicated by the arrow 15 in FIG. 4. As soon as the keys 20 become aligned with the grooves 12, the cutter hub 22 along with the head piece 16 and intermediary 7 can be moved axially of the cylindrical part 9 until the keys 20 exit from the grooves 12. This quick disconnect capability permits fast replacement of the cutter hub and blades without prolonged interruption of the operation of the underwater pelletizer.

To assemble the cutter hub 22, head piece 16 and intermediary 7 onto the cylindrical part 9, it is only necessary to align the keys 20 with the open end of the grooves 12 and move the assembly inwardly axially by compressing the spring 18 or other resilient device until the keys align with the grooves 14. The cutter hub 22, head piece 16 and intermediary 7 are then rotated partially in a clockwise direction until the keys 20 move through the grooves 14 into alignment with the grooves 13 at which time the inward force is released from the cutter hub 22 and the spring 18 or other resilient device will maintain the keys 20 in the grooves 13. However, the keys 20 still are capable of longitudinal movement axially in the grooves 13 with cutter hub 22 and cutter blades 23 biased toward die face 24 as determined by the force of the spring 18 or other resilient device and the fluid pressure exerted against piston 5. With this construction, the quick connect and disconnect capability of the cutter hub holder 30 enables quick removal and replacement of the cutter hub 22. Further, the displacement of the piston by a controlled pneumatic or hydraulic pressure will alter the force biasing the cutter blades 23 toward the die face 24 through the resilient characteristics of the spring 18 or other resilient device which can be compressed or released to provide the optimum resilient bias of the blades 23 toward the die face 24 by the fluid pressure controlling movement of the piston 5, piston rod 6 and sliding member 10.

As above described, the cutter hub holder 30 of the embodiment of the invention as illustrated in FIGS. 1–4 includes those components which interconnect the cutter hub or blade holder 22 with the motor shaft 1. These components include head piece 16, spring 18 or other resilient component, sliding member 10, intermediary 7, piston rod 6, piston 5, cylindrical bore 4 with shoulder 4A and the bayonet coupling between the cylindrical part 9 of the intermediary 7 and the head piece 16.

Figure 5A:
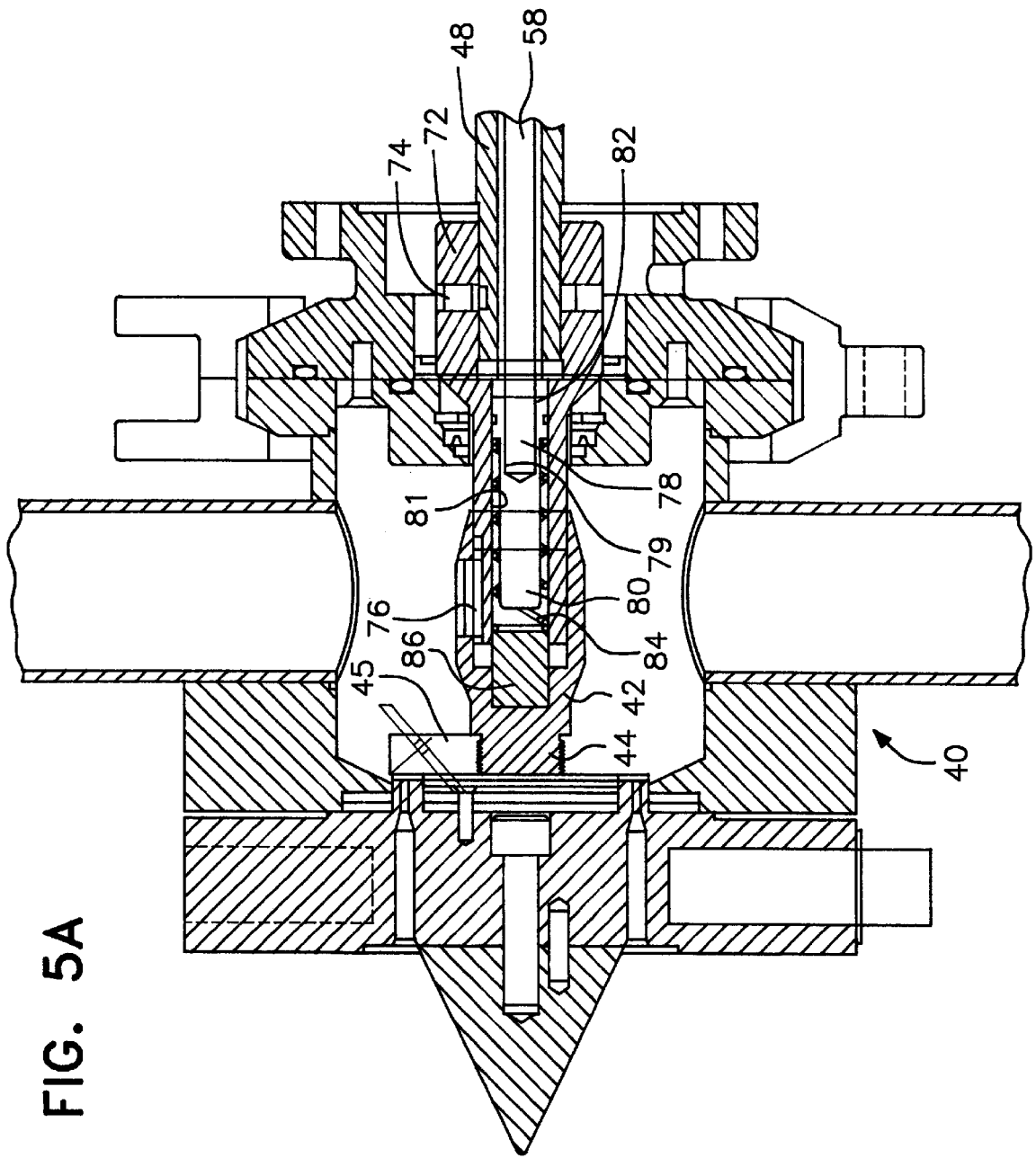
FIGS. 5A and 5B is a longitudinal sectional view, on an enlarged scale, similar to FIG. 1 illustrating the structure of another embodiment of the cutter hub holder and drive assembly of the present invention.
Figure 5B:
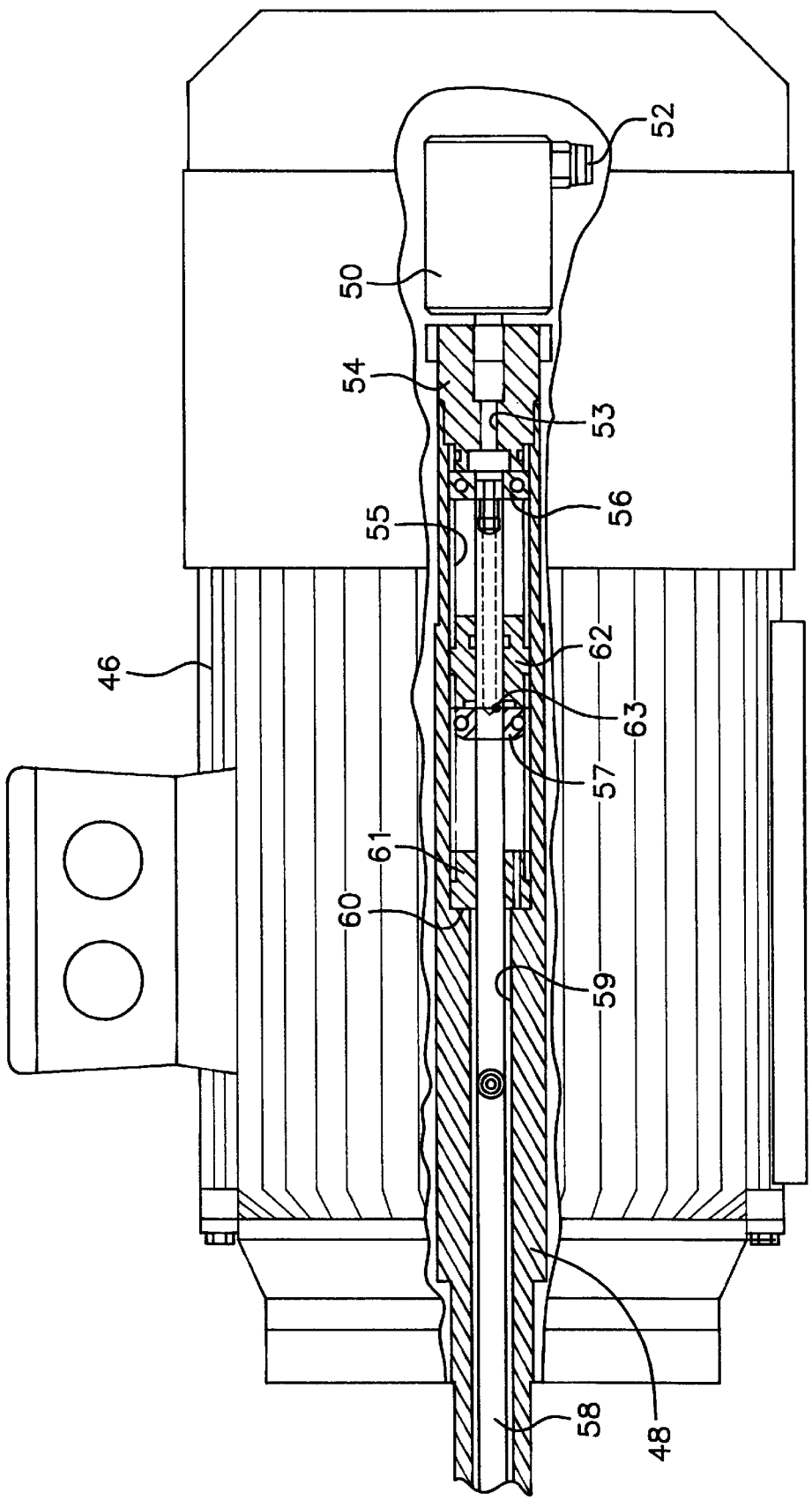

FIGS. 5A and 5B illustrates another embodiment of the invention that is associated with the cutter hub, cutter blades and die plate in the same manner as illustrated in FIGS. 1–4. The cutter hub holder of this embodiment of the invention is generally designated by reference numeral 40 and includes a head piece 42 having an externally threaded projection 44 that is threaded into the cutter hub 45. The cutter hub holder is driven by motor 46 which may be an electric motor, pneumatic motor or hydraulic motor and which includes an elongated drive shaft 48 having an end projecting toward the cutter hub holder 40 which is drivingly connected to the shaft 48. The other end of the shaft 48 is connected to a rotary transmission leadthrough 50 having a pneumatic pressure supply line 52 connected thereto for supplying air pressure into a longitudinal bore 53 in a closure cap 54 on the shaft 48 that is communicated with the rotary leadthrough or union 50. The bore 53 communicates with a larger diameter cylindrical bore 55 in shaft 48 which slidably receives a pair of longitudinally spaced pistons 56 and 57. Pistons 56 and 57 are fixedly mounted in longitudinally spaced relation on a piston rod 58, and each sealingly engages the bore 55. The piston rod 58 extends through bore 55 and a smaller diameter longitudinal bore 59 in the drive shaft 48 which extends from the larger cylindrical bore 55 to the end of the drive shaft remote from motor 46.

The junction between the bore 55 and the bore 59 defines a shoulder 60 engaged by a guide member 61 which slidingly supports the piston rod 58. A second guide member 62 is fixedly mounted in bore 55 between the pistons 54 and 56 to also support the piston rod 58. The guide members 61 and 62 are preferably constructed of aluminum and limit the movement of the pistons 56 and 57 as well as support the piston rod 58. The portion of the piston rod 58 between the two pistons 56 and 57 is hollow to form a bore 63 which communicates with the surface of the piston 56 and bore 53. The bore 63 extends to a radial hole 64 to admit fluid pressure between piston 57 and guide member 62. This enables pneumatic pressure to exert force on the surface area of the piston 56 and the surface area of the piston 57 thereby providing an axial force on the piston rod 58 that is the sum of the force applied to the pistons 56 and 57. If desired, the fluid pressure medium could be hydraulic and the lines etc. fitted therefor.

The end of the drive shaft 48 adjacent cutter hub holder 40 telescopes into an intermediary 72 and is secured thereto by a set screw 74. The intermediary 72 extends into the head piece 42 which is axially movable in relation to the intermediary by a keyed or splined connection 76. The piston rod 58 terminates in a projection 78 received in a cavity 79 in a piston 80 movable axially in a bore 81 in a portion of the intermediary 72 which telescopes into the head piece 42. The piston 80 includes a piston head 82 which engages a coil compression spring 84. The opposite end of the coil spring 84 engages an insert 86 in the head piece 42 of the cutter hub holder 40.

This embodiment of the invention relates to the die plate and water box and functions in a manner similar to that illustrated in FIGS. 1–4 except that the drive shaft 48 includes the enlarged cylindrical bore 55 in which two pistons 56 and 57 are mounted rigidly on the piston rod 58 and are received in bore 55. Both pistons 56 and 57 are subjected to fluid pressure to increase the force exerted by the piston rod 58 to a force greater than the single piston as illustrated in FIGS. 1–4.

The cutter hub holder 40 of the embodiment of the invention as illustrated in FIGS. 5A and 5B interconnects the cutter hub holder 40 with the motor shaft 48 by the use of a head piece 42, spring 84 and axially movable key connection 76 between the cutter hub holder 40 and an intermediary 72 that is rigidly affixed to the motor shaft 48. The motor shaft 48 in this embodiment of the invention includes a cylindrical bore 55 receiving the piston rod 58 having two axially spaced pistons 56 and 57 mounted thereon to provide a force that is a summation of the fluid pressure forces exerted on both of the pistons.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A cutter hub holder for blades acting in conjunction with a die plate of an underwater pelletizer comprising a blade holder drivingly connected to a driven shaft and biased axially toward the die plate at a variable controlled pressure by a resilient device and biased in the direction of the die plate by fluid pressure, said shaft being provided with an axial bore, the shaft bore including a cylinder bore, and the other end of the shaft bore being connected to a source of fluid pressure by a rotary transmission leadthrough, said cylinder bore slidably receiving a piston and piston rod acting on the holder through said resilient device.

2. A cutter hub holder according to claim 1, wherein said driven shaft is the shaft of a motor.

3. A cutter hub holder according to claim 1, wherein said holder is constructed as a tubular head piece drivingly connected with an intermediary connected with the shaft, said intermediary including a bore extending therethrough receiving said piston rod, said resilient device being engaged between said piston rod and said head piece and axially movably mounting the head piece on said intermediary.

4. A cutter hub holder according to claim 3, wherein said head piece is removably and axially movably mounted on said intermediary and a bayonet coupling removably mounting the head piece on the intermediary.

5. A cutter hub holder according to claim 4 in which the coupling comprises a pair of parallel grooves in said intermediary, one of which is open at an outer end and the other groove being closed at an outer end, said pair of grooves being connected with each other at their inner ends by a radial peripheral groove, said head piece having at least one key protruding radially into a bore therein in engagement with said grooves and enabling the head piece to shift axially when said key is engaged with the other of said pair of grooves.

6. A cutter hub holder according to claim 5 in which said intermediary includes two diametrically opposed pairs of grooves and said bore in the head piece includes two keys.

7. A cutter hub holder for blades acting in conjunction with a die plate of an underwater pelletizer which comprises a blade holder drivingly connected to a driven shaft and biased axially toward the die plate at a variably controlled fluid pressure, said blade holder also biased toward the die plate by a resilient device, said resilient device being biased in relation to the die plate by said variably controlled fluid pressure for controlled variation in the pressure exerted on the blade holder toward the die plate, said driven shaft being provided with an axial bore having one end connected to a source of fluid pressure controlled by a pressure regulator, said bore at an opposite end including a piston and piston rod slidable in the bore and engaging said resilient device for exerting a variably controlled force on the blade holder.

8. The cutter hub holder as defined in claim 7, wherein said cutter hub holder includes a tubular head piece supporting said blade holder, said head piece being axially movable in relation to the driven shaft and rotatably driven by said driven shaft, said resilient device being positioned in a bore in said head piece with one portion of the resilient device exerting a force on the head piece and another portion of the resilient device being compressed and expanded by movement of said piston and piston rod.

9. The cutter hub holder as defined in claim 7, wherein said driven shaft and said blade holder are provided with a quick connect/disconnect coupling to enable the blade holder to be quickly and easily replaced.

10. The cutter hub holder as defined in claim 9, wherein said quick connect/disconnect coupling includes a bayonet coupling between the blade holder and driven shaft.

11. A quick connect and disconnect coupling between a blade holder drivingly connected to a driven shaft and biased axially toward a die plate of an underwater pelletizer which comprises a tubular member connected with the blade holder and telescopically engaged with the driven shaft, said quick connect and disconnect coupling comprising a bayonet coupling of the tubular member with the driven shaft to enable quick replacement of the blade holder.

12. The quick connect and disconnect coupling as defined in claim 11, wherein said bayonet coupling enables axial movement of the tubular member in relation to the driven shaft when the bayonet coupling drivingly connects the tubular member and driven shaft to enable biased movement of the blade holder toward the die plate.

13. The quick connect and disconnect coupling as defined in claim 12, wherein said tubular member includes an intermediary drivingly and axially movable in relation to the blade holder, said driven shaft including a bore communicated with a variably controlled source of fluid pressure, said intermediary including a bore extending between the bore in the driven shaft and a bore in said tubular member, a resilient device positioned in the bore in the tubular member, and a piston and piston rod associated with said bores and said resilient device to be moved axially in response to variably controlled fluid pressure introduced into the bore in the driven shaft for varying the pressure exerted on the blade holder by said resilient device.

14. The quick connect and disconnect coupling as defined in claim 13, wherein said driven shaft includes parallel slots having inner ends connected by a peripheral slot, one of said slots having an open outer end communicating with the end of the driven shaft, the other of said slots having a closed outer end spaced inwardly from the end of the driven shaft, said intermediary includes a key engaged in said slots with the key and intermediary being movable longitudinally of the driven shaft when the intermediary key is in the closed end slot, said intermediary being assembled and disassembled in relation to the driven shaft by inward axial movement of the key in the closed end slot by overcoming the resistance of said spring, rotational movement of the key in the slot connecting the inner ends of the parallel slots into alignment with the open end slot and outward axial movement of the key in the open end slot until the key exits from the open end slot.

15. In an underwater pelletizer having an adjustable cutter hub holder axially movably and drivingly connected between a cutter hub having cutter blades mounted thereon and a driven shaft, said driven shaft including a through bore connected with a variable controlled source of pressure to bias the cutter hub and cutter blades toward a die plate of said underwater pelletizer, said variable controlled source of pressure including a spring in said through bore and a regulated source of pressure communicated with said through bore and varying the biasing force exerted by said spring to bias the cutter hub and cutter blades toward a die plate of said underwater pelletizer.

16. In an underwater pelletizer as defined in claim 15, wherein said through bore includes a piston movable axially in said bore in response to fluid pressure variation in the bore, said piston transferring force to said spring to vary the biasing force on said cutter hub by varying the force exerted on said spring by said piston.

17. A cutter hub holder for blades acting in conjunction with a die plate of an underwater pelletizer comprising a blade holder drivingly connected to a driven shaft, a spring extending axially of said driven shaft and biasing said blade holder axially toward the die plate, a variably controlled source of fluid pressure exerting an axial force on said spring and exerting a variable controlled axial biasing force through said spring toward said blade holder.

18. A cutter hub holder according to claim 1, wherein said resilient device is a coil spring.

19. A cutter hub holder according to claim 1, wherein said fluid pressure includes one of hydraulic pressure and pneumatic pressure.

20. A cutter hub holder according to claim 2, wherein said motor is one of an electric motor, a pneumatic motor and hydraulic motor.

21. A cutter hub holder according to claim 1, wherein said holder includes a tubular head piece axially movably supported on and drivingly connected to an intermediary connected with said driven shaft.

22. An underwater pelletizer which comprises a cutter hub holder rotatably supporting a plurality of cutter blades to cut a series of strands extruded from orifices in a die plate, a drive shaft driving said cutter hub holder and having an axial bore therethrough, a movable piston received in said drive shaft axial bore and operatively connected with said cutter hub holder, and a source of variably controlled fluid pressure connected to apply pressure to said piston to adjust axial bias of said cutter hub holder with respect to the die plate.

23. An underwater pelletizer as defined in claim 22, wherein said drive shaft is a hollow motor shaft driving said cutter hub holder.

24. An underwater pelletizer as defined in claim 22, and further including a resilient device in said drive shaft axial bore between said cutter hub holder and said moveable piston for biasing said cutter hub holder axially toward said die plate.

25. An underwater pelletizer as defined in claim 24, wherein said resilient device in said axial bore comprises a spring engaging said piston to vary movement of the piston in said bore in response to fluid pressure variation in the bore.

26. An underwater pelletizer as defined in claim 25, wherein said piston transfers force to said spring to vary the biasing force on said cutter hub by varying the force exerted on said spring by said piston.

27. In an underwater pelletizer, the combination comprising a cutter hub holder rotatably supporting cutter blades acting in conjunction with a die plate of an underwater pelletizer including a blade holder axially movable and rotatably drivingly connected to a driven shaft and adapted to be biased toward the die plate, and a driven shaft including a through bore and having a driven end remote from said blade holder connected to a regulated source of variable controlled fluid pressure through a rotatable connection to supply variable controlled fluid pressure to said through bore to bias said blade holder axially in relation to said die plate, and a piston positioned and movable axially in said through bore in response to said variable controlled fluid pressure for biasing the blade holder in relation to the die plate.

28. A combination as defined in claim 27, and further including a resilient device in said through bore for biasing said blade holder axially toward the die plate and wherein said piston biases the blade holder in relation to the die plate through said resilient device.

29. A combination as defined in claim 28, wherein said resilient device in said through bore includes a spring engaging said piston to vary movement of the piston in said bore in response to fluid pressure variation in the bore, said piston transferring force to said spring to vary the biasing force on said cutter hub by varying the force exerted on said spring by said piston.

* * * * *